2 Sheets
Sheet 1.

S. Shirley.
Seed-Drill & Roller.

N° 73393. Patented Jan. 14, 1868.

Witnesses:
Chas. McFay
H. E. Stumph

Inventor:
Silas Shirley by
J. W. Beadle Atty

2 Sheets — Sheet 2.
S. Shirley.
Seed Drill & Roller.
Nº 73393. Patented Jan. 14, 1868.
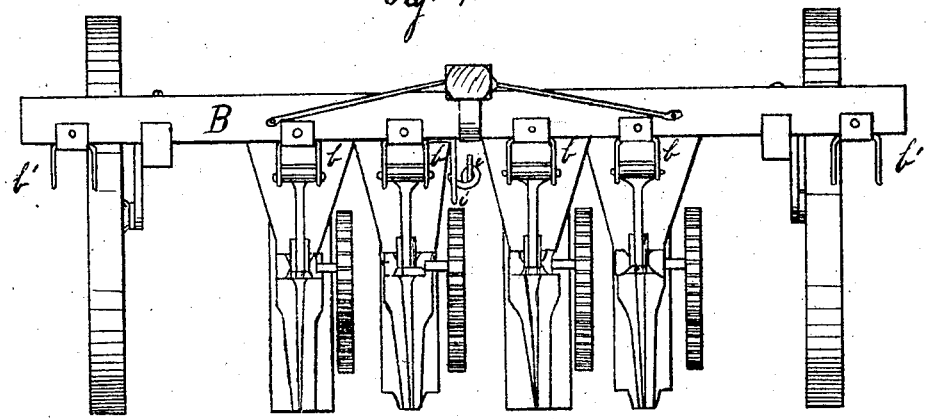
Fig. 4.
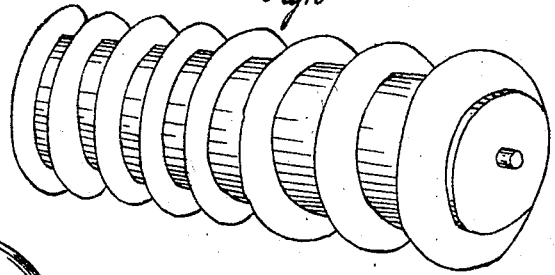
Fig. 5.
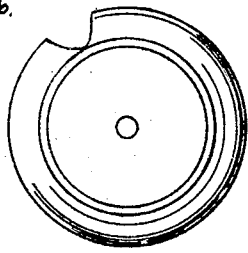
Fig. 6.
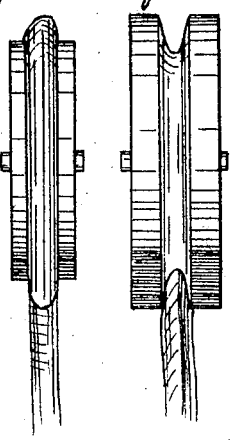
Fig. 7.
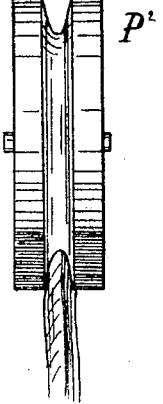
Fig. 8.
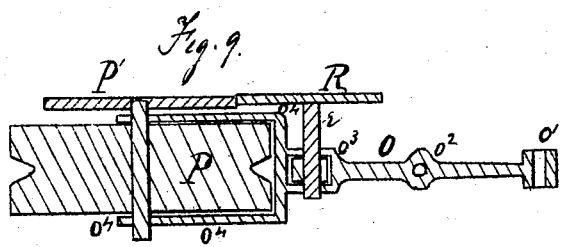
Fig. 9.

United States Patent Office.

SILAS SHIRLEY, OF GUILFORD, ILLINOIS.

*Letters Patent No. 73,393, dated January 14, 1868.*

IMPROVEMENT IN SEED-DRILL AND ROLLER.

*The Schedule referred to in these Letters Patent and making part of the same.*

TO ALL WHOM IT MAY CONCERN:

Be it known that I, SILAS SHIRLEY, of Guilford, in the county of Winnebago, and State of Illinois, have invented a new and improved Seed-Drill and Roller; and I do hereby declare that the following is a full and exact description of the same, reference being had to the accompanying drawings, and to the letters of reference marked thereon.

This invention relates to certain improvements in machines for planting grain, and consists principally of a novel combination of a seed-drill and roller, the former of which is actuated by the latter, both operating together to plant and cover seed; also, in a peculiar form of roller, by means of which the earth is formed in ridges for the better protection of the seed; and also in certain devices for operating the machine, as will be hereinafter fully described. In the drawings—

Figure 1 represents a perspective view of my machine.
Figure 2 a side view.
Figure 3 a view of one of the drills and rollers detached from the machine.
Figure 4 a front view.
Figures 5, 6, 7, and 8, different forms of rollers, and
Figure 9 a section through the line $x\ x$, fig. 3.

To enable others to make and use my invention, I will now proceed to describe its construction and operation.

A represents the framework of the machine, which is supported on the wheels $A^1$ by means of the attachment $A^2$, in which latter are the holes $A^3$, for the purpose of adjusting the frame of the machine to any desired height.

B B represent cross-beams, to which, at suitable distances apart, are attached the clevises $b\ b$, in which are fastened the forward ends of the drills O. The clevises are provided with suitable holes, as shown, to allow changes to be made in the height of the drill, as circumstances may require. The drills are attached to the clevises by means of wooden pins, the object of which arrangement is, that in case an obstacle sufficient to cause fracture should be met with in the progress of the machine, the pin may give way, and serious damage to other parts be thus prevented.

C C represent rollers, suitably supported upon the frame A by means of the standards $C'\ C'$. $c\ c$ represent hooks, placed upon the rollers at distances apart to correspond with the drills, into which are fastened the ends of the chains $c^1\ c^1$, which latter connect with the earth-rollers P. At one end of each of the rollers C C are attached the arms $c^2$, near the centre of which latter is fastened the lever $c^3$, the upper part of which is provided with a spring, $c^4$, as shown, and the lower part of which is bent at right angles, and, passing through a slot in the arm $c^2$, engages with the teeth of the rack D, properly located for that purpose. The spring at the forward end of the lever, exerting an outward force, keeps the lower end firmly in contact with the rack.

O represents the seed-drill, and $o$ represents its frame, which is provided at its forward end with a transverse opening, $o^1$, through which the wooden pin passes, when attachment is made to the clevis $b$, as before mentioned; thence passing backward, at a suitable point, is located the perpendicular socket $o^2$, for the reception of the head of the cutter. In rear of this the chamber $o^3$ is made, as shown in fig. 9, in which the feed-cups on the shaft $r$ operate. The frame then divides into arms $o^4$, which terminate in bearings for the axle of the roller P. $O^1$ represents the hopper, hinged upon the forward and upper side of the chamber $o^3$, being held firmly in place by the rod $s$. $O^2$ represents the drill-point, also hinged upon the forward but lower side of the chamber $o^3$, and held in place by the rod $s^1$.

P represents the roller for covering the seed, upon one end of the axle of which is placed the gear-wheel $P'$, in which gears the wheel R, upon the shaft of which latter are placed the feed-cups within the chamber $o^3$, as before mentioned. By the revolution of the shaft $r$ the seed is regularly delivered into the drill. $p\ p$ represent bails attached to the ends of the axles of the rollers P, to which are fastened the chains $c^1 c^1$, connecting with the upper rollers C C.

E E represent the cutters, which may be made stationary, or to revolve in their sockets, as desired, and which can be adjusted up or down by means of washers. These are used to reduce the draught, by cutting through the earth and roots, and also to relieve the drill-points from the great strain which ordinarily comes upon them.

*t* represents a slide, which is used to shut off communication between the hopper and the feed-cups, when desired. The amount of seed delivered to the drill can be regulated by the size and arrangement of the feed-cups upon the shaft *r*, also by the relative size of the gear-wheels, the shaft being made to turn more or less rapidly, as desired. Access can be had readily to any part of the drill, by simply unhooking the rods $s\ s'$ which hold the hopper and drill-point in place.

It will be observed that the rollers P are of peculiar construction, being provided with the V-shaped projection, as clearly shown in figs. 5 and 7, the object of which arrangement is to form furrows for the better protection of the seed. The necessity of better means of protection for seed is especially apparent in fall sowing, where the grain lies exposed to the action of the frost during the winter. For want of it the crop is often seriously damaged, and sometimes entirely lost.

Experience has shown that upheaval by the frost is less damaging, when the ground is broken by ridges, than when the surface is level. By the use of my roller, the ground is left in ridges, and the seed is placed at the bottom of the furrow. In this position it receives moisture, and, when starting in the spring, is protected from the high winds until well rooted, and is in no danger of being blown up by the roots, as is sometimes the case.

Figure 6 represents one of my improved rollers, with a portion cut away, as shown at *x*, the design of which is to form ridges across the furrow, as shown at *y*, in the perspective view, fig. 1, by which means the washing away of the seed upon uneven ground will be effectually prevented.

Figure 8 represents another form of roller, which, instead of being made with a projection, has a depression, as shown, by which means the seed is covered by a ridge. This form answers the same purpose, in regard to forming the ground properly, and is especially adapted to covering seed deeply, and also to turn the water away from them in wet localities.

Figure 1:
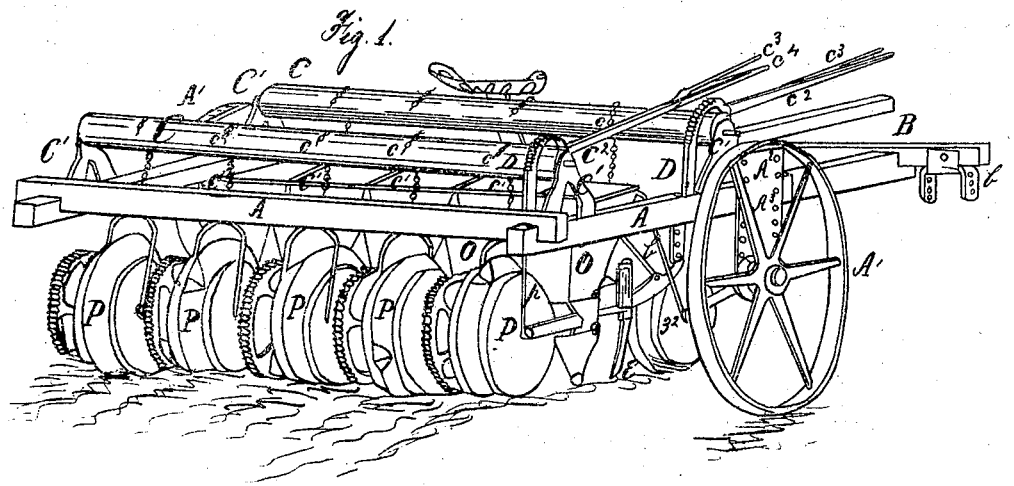
Figure 2:
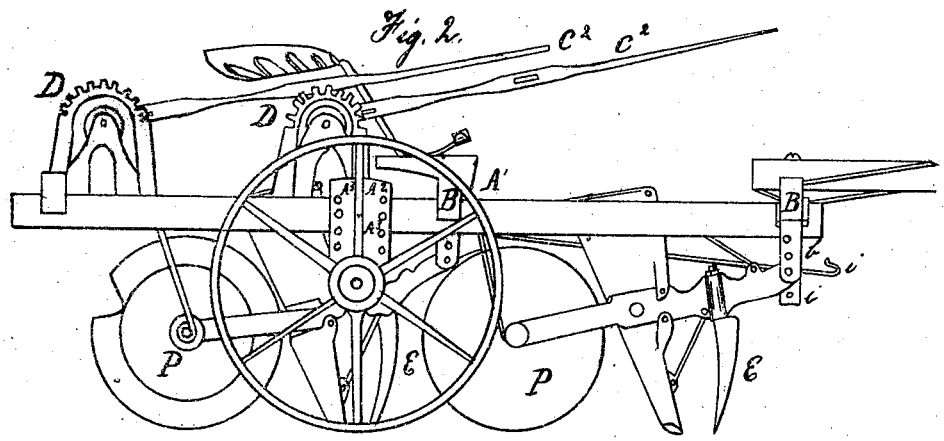
Figure 3:
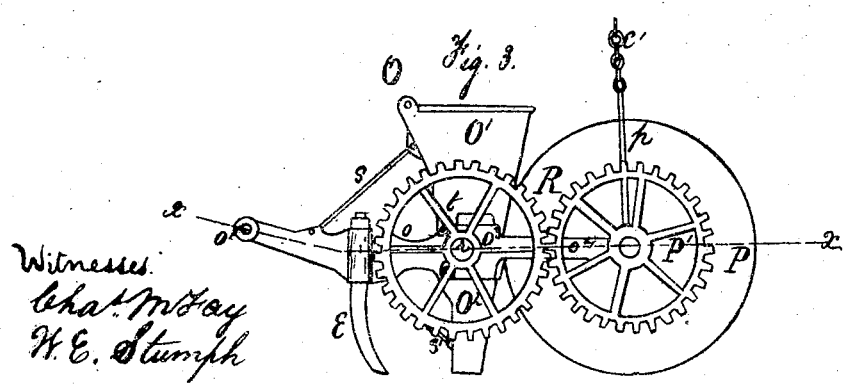

Of course, this improved roller in any of its forms can be used with or without the drill. In the machine the rollers are arranged to break joints, so that the whole surface of the ground is properly rolled.

$b\ b'$, on the front cross-bar, represent clevises, placed outside of the line of the wheels, to each of which it is intended to attach a drill and roller, all the others being removed, with the exception of the centre drill on the rear cross-bar, this arrangement being made for the purpose of planting corn.

The manner of attaching the drills and rollers to the frame A is such that the former can be easily removed and other devices attached, as desired; for instance, a drag with cultivating-teeth could be attached, and operated by the devices used for the drills, for the purpose of cultivating crops of any kind.

The draught is regulated by raising or lowering the rod *i*, to which the evener is attached, the bar $i'$ being provided with holes for the purposes of adjustment.

The operation of my machine is as follows: The frame having first been set at the proper height, by means of the attachment $A^2$, and the drills adjusted by means of the holes in the clevises *b*, the hoppers are filled with seed, and the team started. The rollers P beginning, of course, immediately to revolve, motion is communicated, by means of the gear-wheels $P'\ R$, to the shaft *r*, upon which are the feed-cups in the chamber $o^3$, by which means the seed is regularly delivered as the machine advances. The rollers following, cover the seed properly, and leave the ground in ridges, the form depending upon the construction of the rollers. When it is desired to elevate the rollers for any purpose, the arm $c^2$ is raised, the lower end of the lever $c^3$ being first disconnected from the rack D, by having its upper end pressed toward the arm $c^2$. The rollers C C are thus caused partly to revolve, and, by means of the chains $c^1\ c^1$, the rollers P are elevated. In case a serious obstruction strikes one of the cutters, the wooden pin which fastens the drill to the clevis gives way, and serious damage is prevented.

Having thus described my invention, what I claim as new, and desire to secure by Letters Patent, is—

1. The wheels $A^1$, with attachment $A^2$, in combination with frame A, when arranged as described.

2. The frame *o*, cutter E, hopper O, drill-point $O^1$, rods $s\ s'$, when combined and arranged as and for the purpose explained.

3. The roller P with V-shaped projection, having a triangular section cut out, as shown, as and for the purpose explained.

This specification signed and witnessed, this eighteenth day of November, 1867.

SILAS SHIRLEY.

Witnesses:
   C. W. SHELDON,
   G. W. FOVET.